SYNCHRONIZED CLOCK GENERATOR

Filed Sept. 9, 1965

INVENTORS
JEAN LEMIÈRE
CONSTANTIN M. MELAS

BY Maurice H. Klitzman
ATTORNEY

United States Patent Office 3,355,550

Patented Nov. 28, 1967

3,355,550

SYNCHRONIZED CLOCK GENERATOR

Jean Lemière, Cagnes-sur-Mer, and Constantin Michael Melas, Antibes, France, assignors to International Business Machines Corporation, Armonk, N.Y., a corporation of New York Filed Sept. 9, 1965, Ser. No. 486,085
Claims priority, application France, Mar. 4, 1965, 7,551
3 Claims. (Cl. 178—88)

ABSTRACT OF THE DISCLOSURE

A clock pulse generator synchronized from an input data waveform transmitted at a rate greater than the Nyquist speed, wherein oscillator synchronization is developed from selected points where said input data waveform crosses a varying threshold level and is maintained by means of oscillator phase locking.

This invention relates to a clock pulse generator, and more particularly to a clock pulse generator which is synchronized from an input data waveform at selected points where the input data waveform crosses a varying threshold level.

In pulse communications systems it is often necessary to produce a clock timing signal which is, as closely as possible, synchronized with the transmitted information signal. The transmitted information cannot be decoded correctly unless the timing circuits in the receiver are correctly synchronized. In most prior art devices, the signal received is of a binary nature and the timing pulses are derived therefrom.

A copending application Ser. No. 486,084 by Constantin M. Melas assigned to the assignee of the present application filed September 9, 1965 entitled, "Reception Mode for Signals of a Telegraphic Type Providing a Higher Transmission Speed," relates to a signal receiver wherein the received signal is no longer received on a binary basis since the received signal has more than two levels which depend upon the sequence of the information sent.

As explained in the afore-referenced application by Constantin M. Melas, the transmission speed in pulse transmission systems is related to the bandwidth of the communications channel utilized. The maximum transmission speed through a distortionless line, whose bandwidth is of $f$ cycles, is $2f$ bits per second if the bit identification is performed at reception on a binary basis. This maximum transmission speed is referred to as the Nyquist speed. Whenever the line transmission speed exceeds the Nyquist speed, data identification through signal detection upon a binary basis is not possible at the receiving end. Furthermore, clock pulses can no longer be derived by utilizing conventional clock pulse generators responsive to binary signals. This is because when line transmission speed exceeds Nyquist speed, the received signal goes through a succession of information levels which do not correspond on a binary basis to the data transmitted.

Accordingly, it is an object of this invention to derive a clock timing pulse from input data sent to a binary signal detection system where the data has been transmitted over a communication channel at a speed exceeding Nyquist speed.

It is a further object of this invention to provide a timing clock generator whose output is synchronized with an incoming data waveform having more than two significant information levels which are dependent upon data previously sent.

The above and further objects of the present invention are carried out by deriving synchronizing signals to drive a phase locked clock oscillator from the input data waveform at selected points where the input data waveform crosses a variable threshold level. As explained in the afore-referenced application by Constantin M. Melas, the received signal, which has been transmitted at a speed greater than Nyquist speed, can be detected by comparing it with a variable threshold comprising several reference levels. These reference levels can either be significant levels given by the transmission speed and reached or crossed by the received signal, or the levels intermediary to the significant levels, which are of $2^N$ in number for a transmission speed of N times Nyquist speed. Since the received signal goes through a succession of levels which are generally related to the data already and previously sent through, the threshold reference levels are derived from the data already and previously sent through. According to the present invention, the comparison signal is utilized to synchronize a phase locked clock pulse generating loop.

The foregoing and other objects, features and advantages of the invention will be apparent from the following more particular description of the preferred embodiment of the invention, as illustrated in the accompanying drawings.

Figure 1:
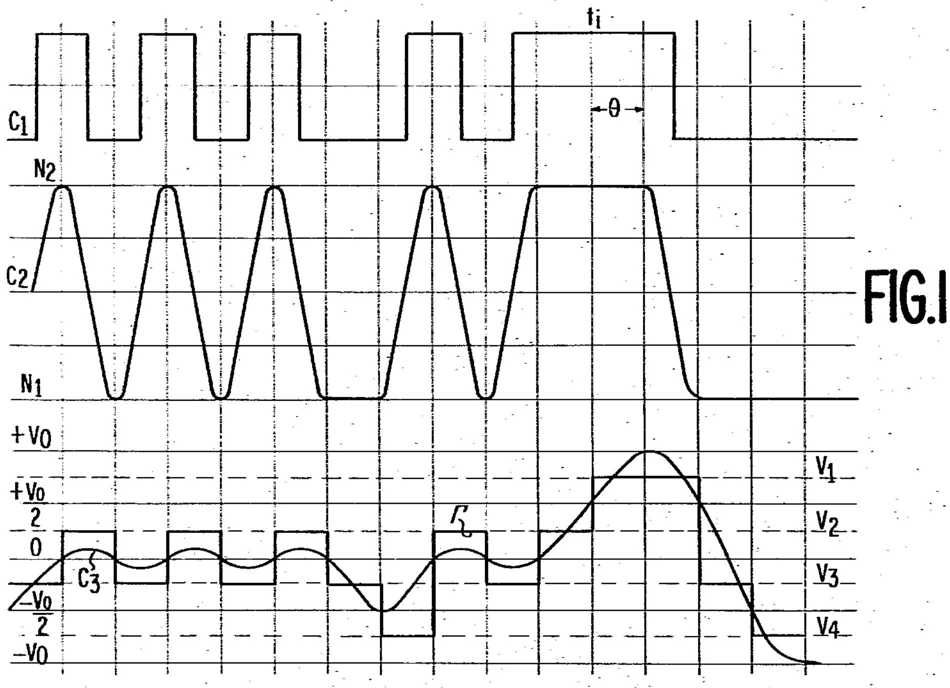
FIG. 1 is an example of a binary message waveform and how the message is distorted when transmitted.

Before describing the details of the synchronized clock generator of the present invention, reference is once again made to the copending application Ser. No. 486,084 filed Sept. 9, 1965 by Constantin M. Melas assigned to the assignee of the present application, entitled: "Reception Mode for Signals of a Telegraphic Type Providing a Higher Transmission Speed" to which the present invention may be applied. Referring now to FIG. 1 of the present invention which substantially duplicates FIG. of the afore-mentioned copending application by Constantin M. Melas, plot $C_1$ shows an example of a binary message to be transmitted. Plot $C_2$ shows a corresponding signal as it appears at a receiver when the binary message is transmitted at a speed of $2f$ bits per second, where represents the bandwidth of the communication channel. This is sometimes referred to as the Nyquist speed. Plot $C_3$ shows a corresponding signal as it appears at a receiver when the binary message is transmitted at twice Nyquist speed. This signal may be interpreted according to the method shown in the afore-mentioned copending application of Constantin M. Melas, which method will now be summarized in the case of the signal being transmitted at twice Nyquist speed.

As shown by plot $C_3$ of FIG. 1, the signal level may reach one of the five following thresholds at the characteristic instants $t_1$ of the message: $+V_0$, $+V_0/2$, $-V_0/2$, $-V_0$. The level of the received signal is dependent upon the preceding and already sent through data. The correspondence between the five above-mentioned levels, the data previously transmitted, and the effective binary value of the received data signal is shown by the following chart K:

| | Level | Data Value |
|---|---|---|
| K | (1) $+V_0$ | 1. |
| | (2) $+V_0/2$ | 1 except when previous two data are 1. |
| | (3) 0 | 1 whenever previous data is 0. 0 whenever previous data is 1. |
| | (4) $-V_0/2$ | 0 except when previous two data are 0. |
| | (5) $-V_0$ | 0. |

Referring now to plot $C_3$ of FIG. 1, it can be seen that the received signal is characterized by the following points:

(1) If the values of the previous two data are 1:

(a) the received signal reaches level $+V_0$ if the data transmitted by the received signal is of value 1, (b) the received signal will at the most reach level $+V_0/2$ if the data transmitted by the received signal is of value 0.

In order to find out if the received data is either 1 or 0, it suffices to know if the received signal is greater or smaller than $V_1$ where $V_0/2<V_1<V_0$.

(2) If values of the previous two data are 1 for the last data and 0 for the one before the last data:

(a) the received signal reaches at least level $V_0/2$ if the data transmitted by the received signal is of value 1, (b) the received signal will at the most reach level 0 if the data transmitted by the received signal is of value 0.

In order to find out if the received data is either 1 or 0, it suffices to know if the received signal is greater or smaller than $V_2$ with $0<V_2<V_0/2$.

(3) If the values of the previous two data are 0 for the last one and 1 for the one before last:

(a) the received signal reaches at least level 0 if the data transmitted by the received signal is of value 1, (b) the received signal reaches at the most level $-V_0/2$ if the data transmitted by the received signal is 0.

In order to find out if the received data is either 1 or 0, it suffices to know if the received signal is greater or smaller than $V_3$ with $-V_0/2<V_3<0$.

(4) If the values of the previous two data are 0:

(a) the received signal reaches at least the level $-V_0/2$ if the data transmitted by the received signal is of value 1, (b) the received signal reaches level $-V_0$ if the data transmitted by the received signal is of value 0.

In order to find out if the received data is either 1 or 0, it suffices to know if the received signal is greater or smaller than $V_4$ with $-V_0<V_4<-V_0/2$.

From the fact that signal crossings of thresholds $V_0$, $V_0/2$, 0, $-V_0/2$, $-V_0$, occur most frequently at characteristic instants $t_i$, when the signal value is to be detected, the clock generator is synchronized by comparing the signal to a variable threshold having either values $V_0$, $V_0/2$, 0, $-V_0/2$, $-V_0$ or $V_1$, $V_2$, $V_3$, $V_4$. The remaining part of this description relates to the case when threshold levels $V_1$, $V_2$, $V_3$, $V_4$ are used, however, it is recognized that the other set of variable threshold levels can be utilized.

Figure 3:
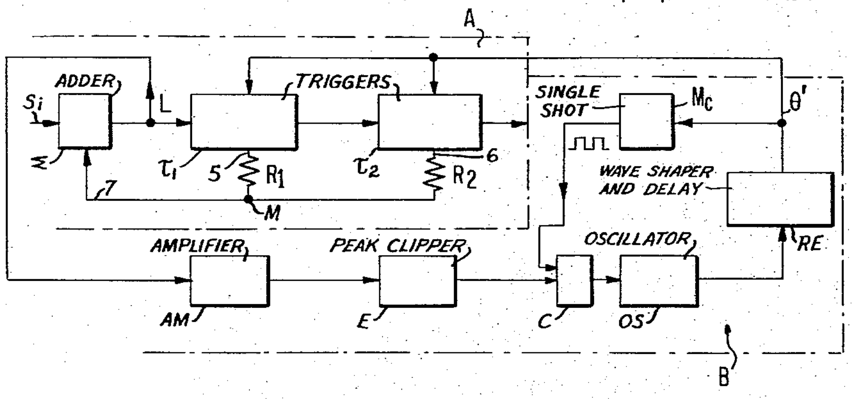
FIG. 3 is a block diagram of the synchronized clock generator and a signal detector.

Referring now to FIG. 3, it shows the overall receiver including the synchronized clock generator. That portion shown schematically within block A is the receiver itself as described in the afore-referenced copending application of Michael Melas and that shown within block B is the synchronized clock generator. Triggers $\tau_1$ and $\tau_2$ store the last two data received and their state, given in terms of these values, will determine the four possible values of the voltage appearing at the output of the resistance network $R_1$ and $R_2$. These four voltage values are selected so that they correspond to the voltage values $V_1$, $V_2$, $V_3$ and $V_4$ defined above. Triggers $\tau_1$ and $\tau_2$ form a two position shift register; Resistors $R_1$ and $R_2$ are joined at node point M. Analog subtractor $\epsilon$ is fed by signal $S_i$ and by the signal from the node point M between resistors $R_1$ and $R_2$. A clock pulse on line $\theta'$ enables control of triggers $\tau_1$ and $\tau_2$ at message characteristic times $t_i$. This clock pulse is derived from the input data as shown hereinafter. Flip-flops $\tau_1$ and $\tau_2$ will position themselves according to the data values 0 or 1 that they store. $\tau_1$ emits through wire 5 a voltage $V'_1$ or $V'_2$ according to the data value 1 or 0 that it stores. Likewise, $\tau_2$ emits either voltage $V''_1$ or $V''_2$ through wire 6. If, for example, $R_1$ is equal to $R_2$, voltage $V_M$ at node point M is then:

$$V_M=\frac{V'_1+V''_1}{2}$$

if data stored in $\tau_1$ is 1 and data stored in $\tau_2$ is 1, $$V_M=\frac{V'_1+V''_2}{2}$$

if data stored in $\tau_1$ is 1 and data stored in $\tau_2$ is 0, $$V_M=\frac{V'_2+V''_1}{2}$$

if data stored in $\tau_1$ is 0 and data stored in $\tau_2$ is 1, $$V_M=\frac{V'_2+V''_2}{2}$$

if data stored in $\tau_1$ is 0 and data stored in $\tau_2$ is 0.

It is possible to choose $V'_1$, $V'_2$, $V''_1$, and $V''_2$ so as to have various potentials of $V_M$ chosen respectively as the above-defined potentials $V_1$, $V_2$, $V_3$, and $V_4$. An example of such a choice is: $V'_1=V_0$, $V'_2=-V_0$, $V''_1=V_0/2$, $V''_2=-V_0/2$.

In these conditions, voltage $V_M$ at node point M for the four cases above-mentioned will be: $\frac{3}{4}V_0$, $\frac{1}{4}V_0$, $-\frac{1}{4}V_0$ and $-\frac{3}{4}V_0$, respectively, therefore, fully satisfying the imposed requisites to $V_1$, $V_2$, $V_3$, and $V_4$. Hence, these voltages may be chosen as values for each of the four potentials.

Figure 2:
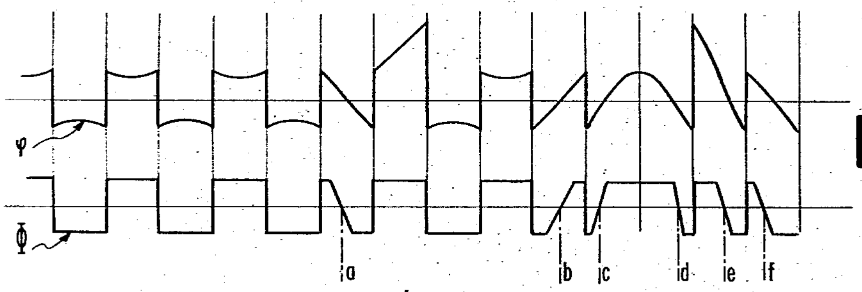
FIG. 2 is an example of signal waveforms at the output of $\epsilon$ and E of FIG. 3.

Wire 7 transmits the voltage $V_M$ at node point M to the analog subtractor $\epsilon$ whose other input is fed by signal $S_i$. Signal $S_i$ is thus being compared at each time $t_i$ to a reference voltage level $V_R=V_M$ which is a function of the last two data values received and in accordance with the requisites imposed on reference voltages $V_1$, $V_2$, $V_3$, and $V_4$. As was previously seen in each case, the data transmitted by the signal $S_i$ is 1 if the signal level $S_i$ is higher than the reference level $V_R$ and the data is 0 if the signal level $S_i$ is smaller than the reference voltage level $V_R$. The analog subtractor $\epsilon$ sends through wire L in each case a positive signal if the signal $S_i$ is higher than $V_R$, and a negative signal if the level of signal $S_i$ is smaller than $V_R$. In the first case, flip-flop $\tau_1$ is triggered to or maintained at 1. In the second case, flip-flop $\tau_1$ is triggered to or maintained at 0. The incoming data is then registered in $\tau_1$ which conveys its previous content to $\tau_2$. Referring now to FIG. 2, an output waveform $\rho$ is shown which corresponds to the output of the analog subtractor $\epsilon$ when the wave transmitted is as in FIG. 1. It is readily apparent that the extreme values of waveform $\varphi$ correspond on a binary basis to the binary values transmitted as shown in plot $C_1$ at the characteristic times $t_i$. The output of this resistance network $R_1$ and $R_2$ to an incoming signal such as shown in plot $C_3$ of FIG. 1 is shown in plot Γ of FIG. 1. Referring once again to FIG. 3, the voltage $V_M$ appearing at the output M of the resistance network and the incoming signal $S_i$ are fed into analog adder $\epsilon$. The output of the analog adder $\epsilon$ is utilized to gate trigger $\tau_1$ at the characteristic instants $t_i$. This output signal at L of FIG. 3 is shown in plot $\varphi$ of FIG. 2. This signal represents the algebraic difference of signal $\Gamma$ and the incoming signal $S_i$.

Referring once again to FIG. 3, the clock generator portion of the receiver is shown schematically as being within block B. This portion comprises an amplifier AM, a wave-shaping device E which clips the peaks of the waves, a coincidence circuit C, an oscillator OS, a wave-shaping and delaying device RE, and a single-shot monostable multi-vibrator $M_c$.

As mentioned above, the signal appearing at the output of the analog subtractor $\epsilon$ is shown in plot $\varphi$ of FIG. 2. This signal is amplified through amplifier AM and clipped at wave-shaping device E so that it appears at the output of E as plot $\Phi$ of FIG. 2. Referring to plot $\Phi$ of FIG. 2, it is seen that the signal crosses an arbitrary, preselected reference level which is midway between the peaks and the valleys of the signal in a symmetrical manner if crossings *a, b, c . . . f* are not considered. These crossings correspond to variations of $\Gamma$, the output signal of the resistance network on line 7 as shown in FIG. 1, which occur at the characteristic instants $t_i$. Hence, by synchronizing the oscillator on those crossings other than *a, b, c . . . f*, it is possible to obtain an arbitrary adjustment of the clock. However, crossings *a, b, c . . . f* happen generally substantially between time instants $t_i$. These pulses can be eliminated as a source of synchronizing signals by phase locking the oscillator OS by utilizing a phase locking loop comprising RE, $M_c$ and C. Thus, the output of the oscillator is delayed and shaped at RE so as to provide a signal having a fast rise time which can be utilized as a clock pulse. The pulse appearing at the output of RE, $\theta'$, is utilized to gate triggers $\tau_1$ and $\tau_2$ and hence forms the desired clock timing pulse. This signal at $\theta'$ is also fed into single-shot multi-vibrator $M_c$. This causes the single-shot multi-vibrator $M_c$ to produce an output pulse whose duration is less than the period of the time instants $t_i$ ($\theta$ FIG. 1 plot $C_1$). This output pulse is utilized to block coincidence circuit C from being gated except when the single-shot $M_c$ is in its stable (off) state. Hence, oscillator OS is gated only by those crossings of the arbitrary reference level which occur systematically and which correspond to the variations of signal $\Gamma$.

While the invention has been particularly shown and described with reference to a preferred embodiment thereof, it will be understood by those skilled in the art that various changes in form and detail may be made therein without departing from the spirit and scope of the invention.

What is claimed is:

1. A data receiver comprising:

an analog adder responsive to an input data waveform having more than two significant information levels dependent on input data previously sent, and to a threshold signal level set in accordance with previously sent input data, and having an adder signal output which is an algebraic function of the comparison between said incoming data and said threshold signal level, said adder signal output having a preselected level when the compared signals are equal;

variable threshold setting means, including shift register means, connected to said analog adder and responsive to said adder signal output for setting said threshold signal level;

phase locked oscillator circuit means connected to said analog adder and responsive at preselected times to the preselected level of said adder signal output for generating clock timing signals, said phase locked oscillator circuit means including means responsive to said clock timing signals for enabling said phase locked oscillator means to generate said clock timing signals only at those points where said incoming data waveform crosses said variable threshold level and which have a constant phase relationship with one another;

said phase locked oscillator circuit means connected to said variable threshold setting means for supplying said clock timing signals to said variable threshold setting means.

2. A data receiver comprising:

an analog adder responsive to an input data waveform having more than two significant information levels dependent on input data previously sent, and to a threshold signal level set in accordance with previously sent input data, and having an adder signal output which is an algebraic function of the comparison between said input data and said threshold signal level, said adder signal output having a preselected level when the compared signals are equal;

variable threshold setting means, including shift register means, connected to said analog adder and responsive to said adder signal output setting said threshold signal level;

an oscillator for generating clock timing signals, connected to said analog adder via amplifying, waveshaping and gating means, and responsive to said preselected level of said adder signal output at preselected times, said oscillator having an output clock timing signal;

a monostable multivibrator connected to said oscillator and responsive to said clock timing signal, and having an output signal the duration of which is less than the period of said clock timing signal;

said gating means responsive to said monostable multivibrator output signal and to the preselected level of said adder signal output for allowing said preselected level to gate said oscillator at preselected times depending upon the duration of said monostable multivibrator output signal, said gating means allowing only those preselected levels which are representative of points where said incoming data waveform crosses said variable threshold level and which have a constant phase relationship with each other to gate said oscillator;

said oscillator connected via waveshaping and delay means to said variable threshold setting means for supplying said output clock timing signals to said variable threshold setting means.

3. In combination, a source input data waveform having more than two significant information levels, receiving means for detecting the effective binary values of said input data waveform which has been transmitted through a communication channel at a speed of N times greater than Nyquist speed where N is an integer value equal to or greater than 2, and a clock timing pulse generator synchronized from the input data waveform at selected points where the incoming data waveform crosses a variable threshold level;

said receiving means including: an analog adder responsive to said input data waveform and to a threshold signal level set in accordance with previously sent input data, and having an adder signal output which is an algebraic function of the comparison between said incoming data and said threshold signal level, said adder signal output having a preselected level when the compared signals are equal;

variable threshold setting means, including shift register means, connected to said analog adder and responsive to said adder signal output for setting said threshold signal level;

said clock timing pulse generator including: a phase locked oscillator, including a phase locked loop, for generating said clock timing pulses, said phase locked loop including multivibrator means deriving an intermediate pulse signal from said clock timing pulses, and gating means responsive to said adder signal output and said intermediate pulse signal for enabling said phase locked oscillator to generate said clock timing pulses at preselected times;

said phase locked oscillator connected to said variable threshold setting means for supplying said clock timing pulses to said variable threshold setting means.

References Cited

UNITED STATES PATENTS 3,274,511 9/1966 Dale et al. -------- 331—18 X

JOHN W. CALDWELL, *Acting Primary Examiner.*

ROY LAKE, *Examiner.*

S. H. GRIMM, T. J. STRATMAN, *Assistant Examiners.*